Dec. 26, 1933.  L. B. GREEN  1,941,396
LOUVER TYPE GRILLE FOR AUTOMOBILE RADIATORS
Filed Feb. 26, 1932  3 Sheets-Sheet 1
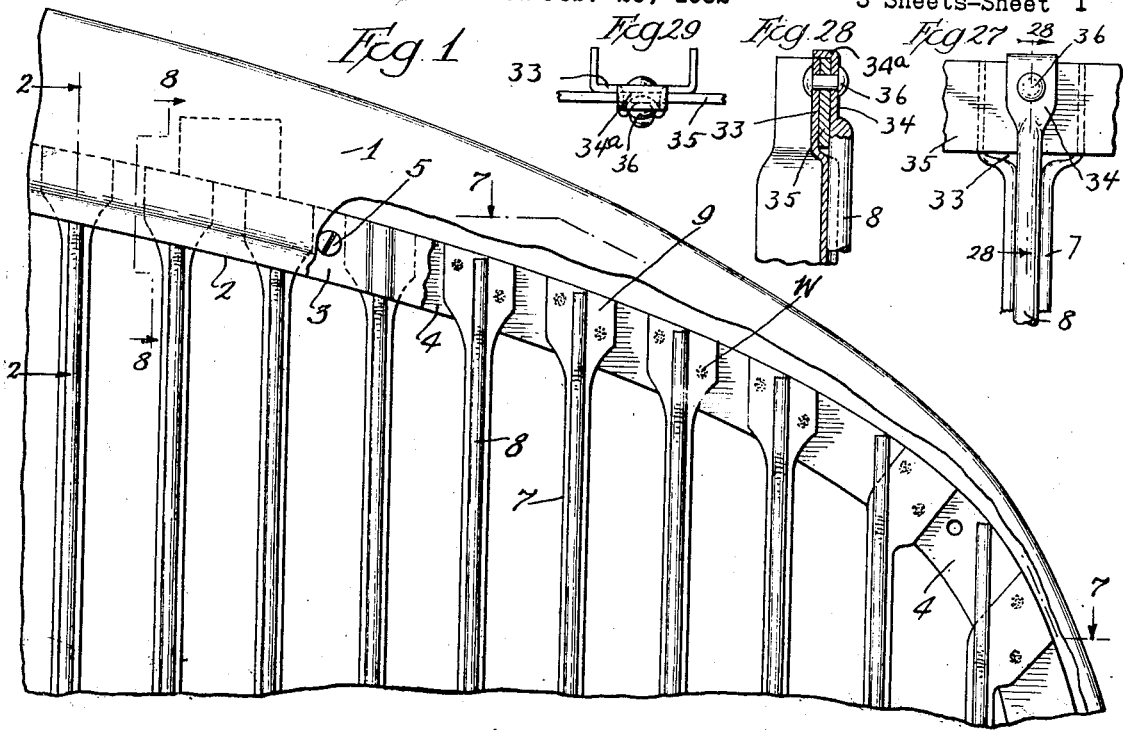
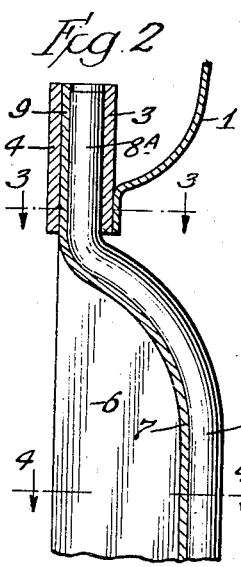
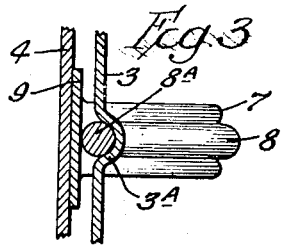
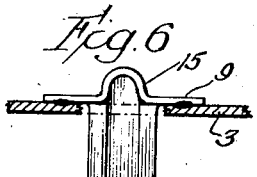
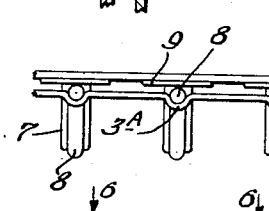
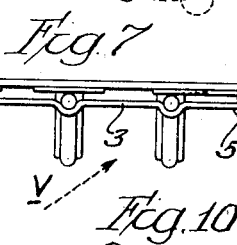
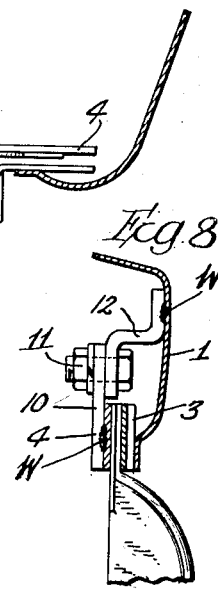
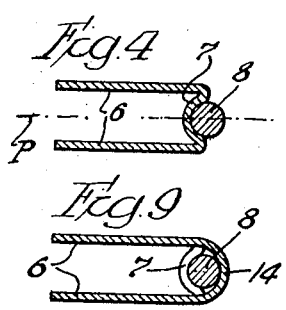
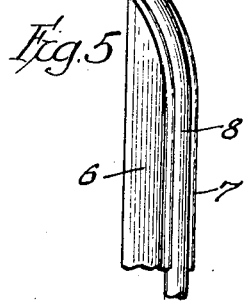
Inventor:
Lee B. Green
by Albert Scheible
Attorney

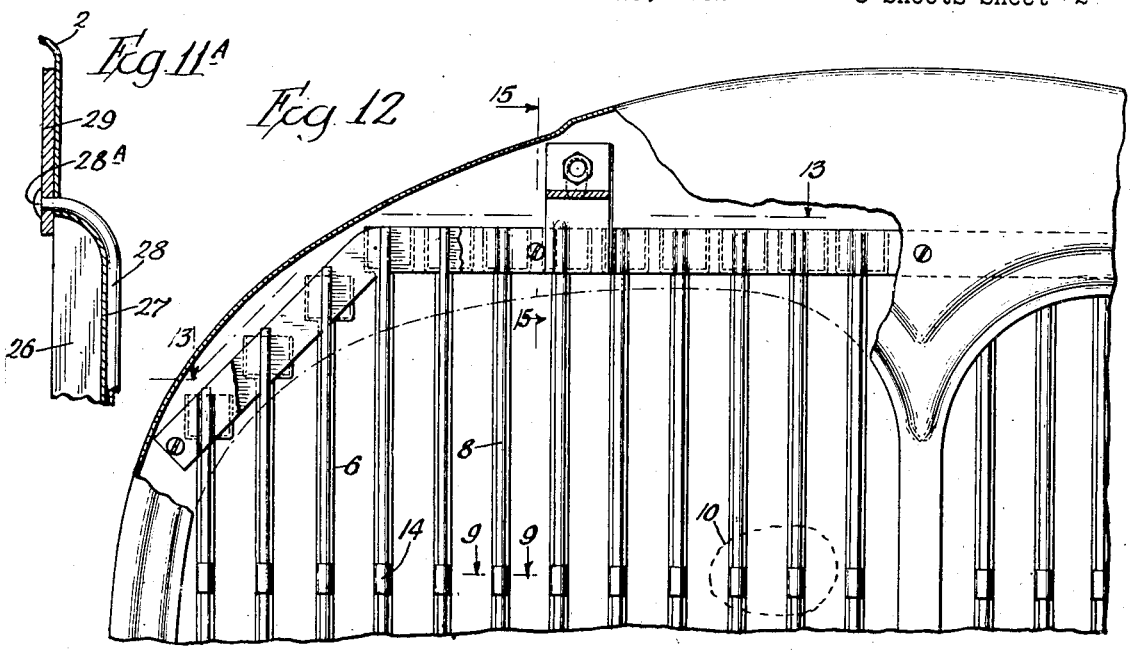
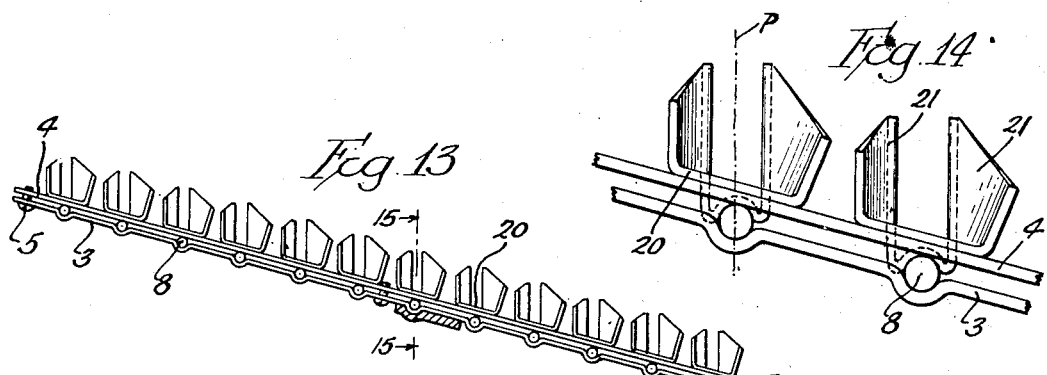
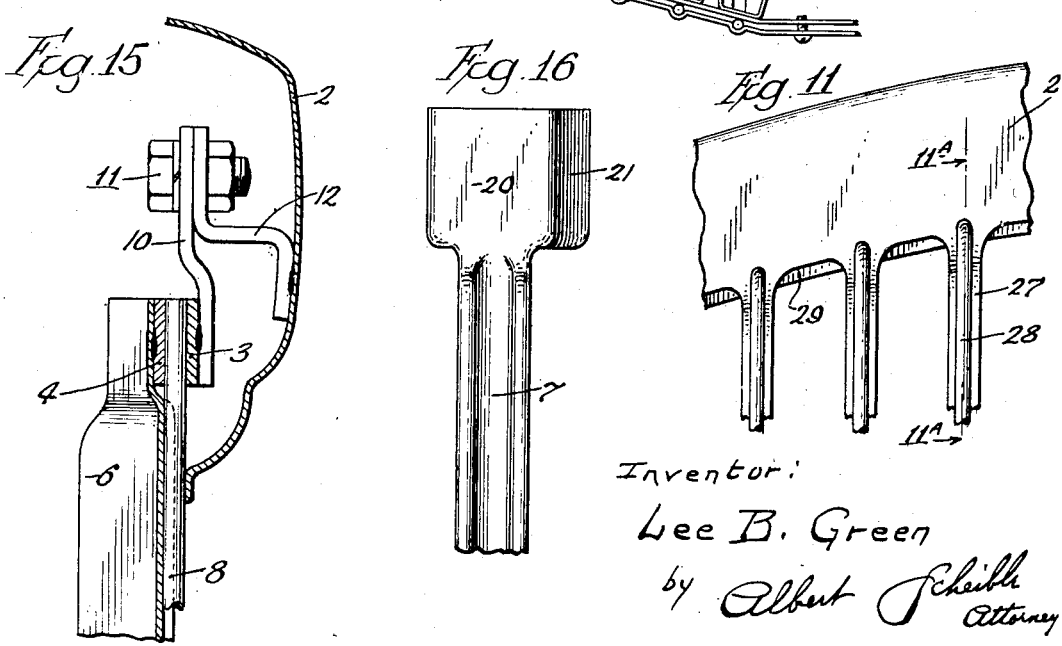

Dec. 26, 1933.       L. B. GREEN       1,941,396
LOUVER TYPE GRILLE FOR AUTOMOBILE RADIATORS
Filed Feb. 26, 1932       3 Sheets-Sheet 3
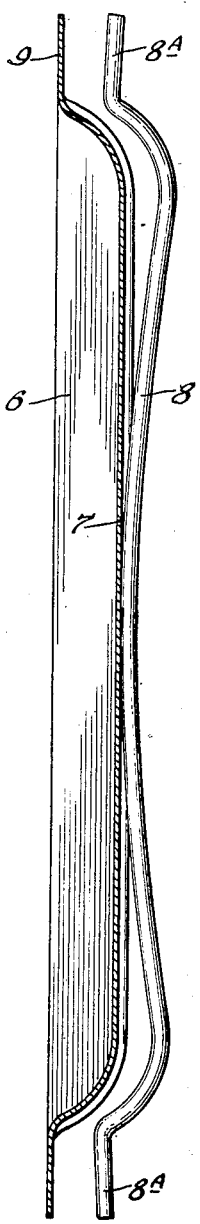
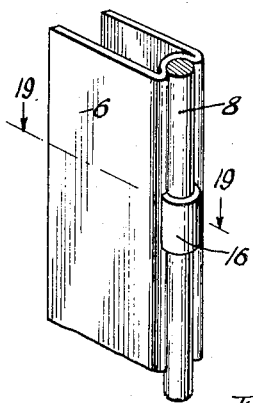
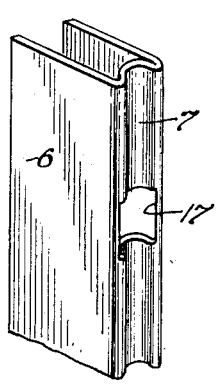
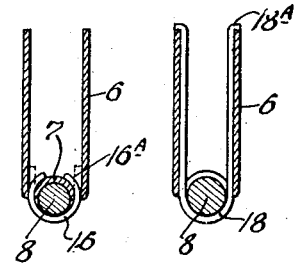
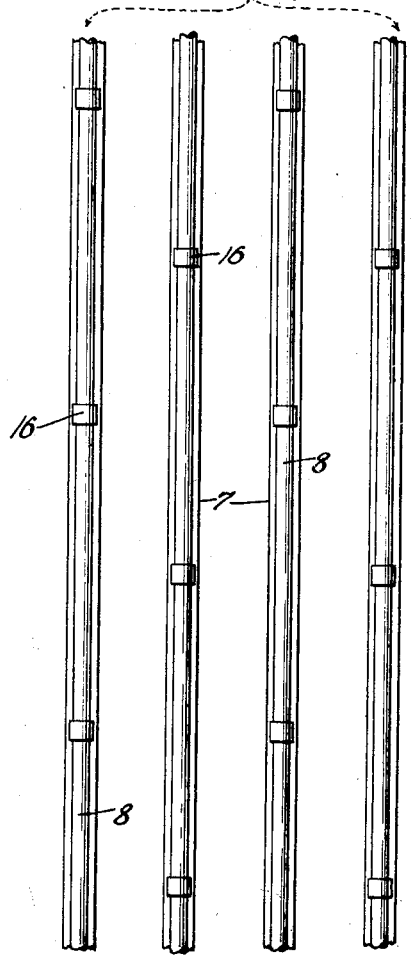
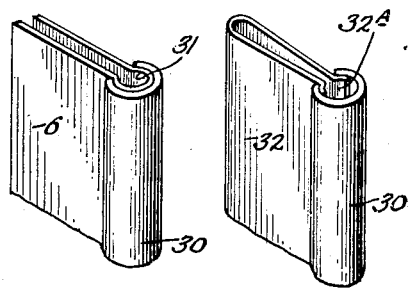
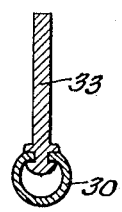
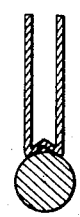
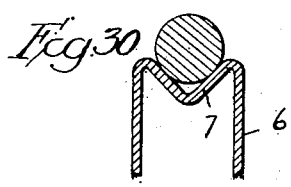
Inventor:
Lee B. Green
by Albert Scheible
Attorney Patented Dec. 26, 1933

1,941,396

UNITED STATES PATENT OFFICE 1,941,396

LOUVER TYPE GRILLE FOR AUTOMOBILE RADIATORS

Lee B. Green, Lakewood, Ohio, assignor to The Globe Machine & Stamping Company, Cleveland, Ohio, a corporation of Ohio Application February 26, 1932. Serial No. 595,298

18 Claims. (Cl. 293—54)

In its general aspects, my invention relates to louvers and to grilles or guards in which the guard-forming portions are generally bar-like and freely spaced members as distinguished from interwoven wires, one of its major objects being that of providing easily manufactured and relatively inexpensive grille or guard bars of decidedly ornamental appearance and rigidity When such grilles or guards extend across an opening through which air is to flow, the constituent bars are usually flattened and disposed so that their wider faces extend at right angles to the general plane of the grille. These bars also usually extend parallel to and with their major portions freely spaced from one another, all of the bars being rigidly secured at each end to cross-bars or frame members When such a louver-bar type of grille is disposed across the frontal opening of an automobile radiator shell, the appearance of the shell and grille assembly is greatly enhanced by brightly plating the grille bars, so that their brightness will detract attention from the comparatively unornamental radiator core behind them. In practice, this plating can readily be accomplished by separately electroplating each grille bar and separately buffing the plating on each bar before the bars are fastened to the cross-connecting members, but the cost of such a separate plating and finishing each bar is undesirably high.

On the other hand, attempts at simultaneously plating the entire bar assembly have encountered two other and also serious objections: Since the flow of current from the anode in a plating bath to the constituent bars of the grille will only be equal when the anode is parallel to the general plane of the grille, the forward edges of these bars must face the anode. Consequently, a halting of the plating operation when an ample layer of the plating metal has been deposited on the forward bar edges will leave the side faces of the bars coated with layers of plating which progressively decrease in thickness toward the rear edge of the bar Owing to this difference in the deposit, a later pealing or stripping of the plating from the rearward parts of the side faces of the bars can only be avoided by continuing the plating operation until the forward bar edges and the side face portions adjacent thereto have received an excess of plating metal which decidedly increase the cost, particularly with chromium plating.

Moreover, after the grille bar assembly has thus been plated, the side faces of the bars cannot be buffed by means of the usual buffing wheels, because such wheels cannot enter the spaces between consecutive bars when these spaces are as small as is demanded in automobile practice for excluding stones and the like. So also, regardless of the separate or conjoint plating of the grille bars, the cost is undesirably increased because of the large surface areas of the side faces of these bars, which areas require correspondingly large amounts of the plating metal, so that automobile manufacturers can only afford to provide their higher priced cars with grilles having plated bars.

In endeavoring to reduce the cost and to facilitate the manufacture of louver-type grilles having plated bar parts, I have made the following observations and discoveries, on which my here presented invention is based:

(1) That the ornamenting effect of bright plating on the bars of an automobile radiator grille is due more to the contrast between visible plated portions of these bars and dark surfaces of any kind, than to the areas of these plated portions.

(2) That the bright plating of the forward edges of such bars is far more important than the plating on their side faces.

(3) That, when viewed in directions oblique to the side faces of the grille bars, a bright plating of only the forward bar edges to contrast with unplated bar sides presents a decidedly ornamental effect.

(4) That such a contrast can be provided expeditiously by separately manufacturing and thereafter assembling two constituent parts of grille bars, namely an unplated main bar part of large surface area (which may be cheaply painted) and a forward brightly plated rod or tube part of such smaller surface as to require much less plating material.

(5) That the two parts of such a grille bar or louver bar can readily be formed so as to interlock with each other against relative lateral shifting, thereby requiring no interwelding or extensive fastening to each other.

(6) That with the two bar parts thus interlocked, the forward rod stiffens the assembly, so that the main bar part can be made of a lighter gauge of metal for a given rigidity of the bar as a whole.

(7) That when the main bar parts are of channel-sectioned steel, the shift-preventing formations can stiffen and strengthen this part so that it can be made of still lighter steel, thereby further reducing the cost.

(8) That the two bar parts can readily be constructed for assembly either by a movement transverse of their axes, or by a relative longitudinal sliding.

(9) That when the forward rod part is of resilient metal, its resiliency can be utilized for simplifying the rigid assembly of the two bar parts.

(10) That the two bar parts can also be secured to each other by simple means which will enhance the resulting ornamental appearance of the assembled bar, and which will permit the production of novel and varied ornamental effects in grilles which include such bars.

(11) That the two parts of such ornamental grille bars can easily and economically be fastened to connecting members to permit an easy attaching of the resulting grille to an automobile radiator shell or other support.

(12) That such two-part grille bars can be cheaply and economically made for disposing the flat side bar faces at varying angles to the common plane of their forward edge portions.

(13) That with such two-part grille bars the main bar portions also can readily be manufactured integral with portions of a radiator shell or radiator front.

(14) That such two-part grille bars can readily be disassembled to permit a rebuffing or replating of the forward bar parts if these lose their brightness.

Examples of the manner in which I have utilized my above recited observations and discoveries will appear from the following specification and from the accompanying drawings, in which drawings Fig. 1 is a front elevation of an upper right-hand portion of an automobile radiator grille embodying my invention and supported by the radiator shell, with some parts broken away.

Fig. 2 is an enlarged section taken along the line 2—2 of Fig. 1.

Fig. 3 is a horizontal section taken along the line 3—3 of Fig. 2.

Fig. 4 is a horizontal section along the line 4—4 of Fig. 2.

Fig. 5 is a perspective view of the upper portion of one of the grille bar and ornamenting rod assemblies of Figs. 1 to 4.

Fig. 6 is a plan view of the assembly of Fig. 5, together with a fragmentary section of the adjacent frame member.

Fig. 7 is a reduced section, taken along the line 7—7 of Fig. 1, with the adjacent upper front portion of the radiator shell omitted.

Fig. 8 is a fragmentary vertical section along the line 8—8 of Fig. 1, showing the supporting of the grille bar and frame assembly from the radiator shell.

Fig. 9 is an enlarged horizontal section along the line 9—9 of Fig. 12.

Fig. 10 is an enlarged perspective view of the grille portion 10 of Fig. 12.

Fig. 11 is a fragmentary elevation of an embodiment of my invention in which the main grille bar parts are integral with the radiator shell.

Fig. 11A is a section along the correspondingly numbered line in Fig. 11.

Fig. 12 is a fragmentary front view of another automobile radiator grille embodying my invention, together with portions of a V-front radiator shell by which it is supported.

Fig. 13 is a fragmentary plan view of the grille of Fig. 12.

Fig. 14 is an enlargement of a portion of Fig. 13.

Fig. 15 is an enlarged vertical section along the line 15—15 of Fig. 12.

Fig. 16 is a front elevation of one of the grooved grille bars of Fig. 1, drawn on the same scale as Fig. 14.

Fig. 17 is a vertical section taken in the medial plane of a grooved grille bar of the type of Fig. 5, showing a resilient ornamenting rod as it appears before the end portions of this rod are clamped against those of the grille bar.

Fig. 18 is an enlarged perspective view of a portion of a grille bar and ornamenting rod assembly in which the rod is fastened to the bar by a metal clip, and Fig. 19 is a horizontal section taken through Fig. 18 along the line 19—19.

Fig. 20 is a section similar to Fig. 19 but showing the use of another form of rod-forming clip, and Fig. 21 is a perspective view of a portion of the grille bar of Fig. 20 before the rod and clip are attached.

Fig. 22 is a fragmentary front elevation of a group of grille bar and rod assemblies of the types of Figs. 10, 18 and 21, showing the ornamental effect produced by a relatively staggered position of the rod-anchoring clips.

Figs. 23 and 24 are perspective views of grille bar and rod assemblies also embodying my invention, showing the use of an ornamenting strip slidably attached to the forward edge of a U-sectioned grille bar; and Fig. 25 is a transverse section showing a slit ornamenting tube attached to a solid and generally flat grille bar.

Fig. 26 is a transverse section allied to Fig. 4, showing a two-part grille bar assemblage in which the ornamenting rod is of larger diameter than the effective total width or thickness of the main part of a grille bar.

Fig. 27 is a fragmentary elevation showing a direct riveting of one of my ornamenting rods to both the adjacent louver bar and a single frame member.

Fig. 28 is a section along the correspondingly numbered line of Fig. 27.

Fig. 29 is a plan view of the interconnected parts of Fig. 27.

Fig. 30 is an enlarged section through a louver bar and the adjacent ornamenting rod, showing the groove in the bar as formed to afford a two-line engagement of the rod.

In the drawings, Fig. 1 shows part of the front 1 of an automobile radiator shell, which front has the usual opening 2. Normally concealed by this front are two flat frames 3 and 4, between the portions of which frames the end portions of the two-part grille or louver bars are clamped by screws 5 (Figs. 1 and 7) which connect these frames.

The main and rearward part of each two-part grille bar is of a channel section comprising parallel and upright webs 6 connected at their forward ends by a channel back 7 which is forwardly concaved to present a groove in which the forward part or rod 8 is seated. As here shown, each main bar part has its extreme end portion flattened to present a flat end portion 9 which is secured by welds W (Figs. 1 and 8) to the rearward frame 4. Each rod 8 has its end parts correspondingly bent so that its extreme end portions 8A bears flatwise against the forward face of the adjacent bar end 9 as shown in Figs. 2, 5 and 7; and the forward frame 3 desirably has forwardly arched formations 3A (as shown in Figs. 3 and 7) for also interlocking with the rod ends 8A.

With the axes of these arch formations spaced to correspond to the spacing between the medial planes P of the main bar parts (Fig. 4), and with the ornamenting rods formed to fit continuously against the frontal bar groove for the entire length of the latter, the conjoint clamping bar ends 9 and the rod ends 8A between the two frames 3 and 4 by the screws 5 holds all of the bar and rod parts of the entire grille or louver assembly rigidly united; so that these bars and rods together with the two frame parts constitute a rigidly framed grille, which grille can then be attached as a unit to any suitable support. For example, Fig. 8 shows a lug 10 welded to the rear frame member 4, which lug is attached by a bolt 11 to a bracket 12 welded to the radiator shell front 1.

With the ornamenting rod 8 bent so as to snugly fit against the forward face of the back of the channel-sectioned main grille bar part for the entire length of the rod, the mere clamping of each rod end to the adjacent bar end will suffice with moderate lengths of the grille bars for affording an adequately rigid assembly. However, I desirably make the rods 8 of resilient metal and initially form each such rod that its main portion convexes rearwardly, as shown in Fig. 17. With a resilient rod thus initially formed, its resiliency will continually tend to press the mid-length portion of the rod against the bottom of the groove in the adjacent grille bar part, so as to prevent any shifting of the rod transversely of that groove in case of inaccuracies in manufacture.

Where the aperture spanned by my two-part louver or grille bars is such as to require bars of considerable length, I desirably provide auxiliary means for clamping the ornamenting rods to the main bar parts at one or more points intermediate of their length; and I also may employ such auxiliary clamping means even with bars of relatively short length, because of the additional ornamenting afforded by them.

For this auxiliary clamping I may employ integral arches 14, formed by punching parts of the forward face portions 7 of the main bar parts so as to arch over forward portions of the rods 8, namely an integral formation as shown in perspective view in Fig. 10 and in section in Fig. 9, so that the rear faces of these arches form parts of a common cylindrical surface with the groove in the bar front 7. When the rods are then slidably inserted, these arches form bands extending across the rods 8 as in Fig. 12; and if the bars have been given a black coating, these bands will contrast with the plated rods to add to the ornamental appearance.

However, the additional rod clamping means need not be integral parts of the main or bar portions of the grille louvers. For example, Fig. 18 shows the use of an initially U-shaped clip which has its shanks 16A inserted through perforations in a grooved bar front 7 (as shown in dotted lines in Fig. 19) and then clinched against the back of that front, so that the resulting assembly appears as in Fig. 18. Or, each bar front may have a wide aperture 17 as shown in Fig. 21, and the rod may be clamped against the bar by a U-shaped clip 18 which has its end 18A hooked over the rear edges of the bar webs 6, as shown in Fig. 20, thereby also producing an assembly of the same frontal appearance as Fig. 18.

When any of the heretofore described grille bar and rod assemblies are viewed squarely from the front, the plated rods 8 will contrast sharply with the dark and dimly lighted radiator core behind them, and the resulting ornamental effect will also be enhanced by the contrast between the bright rods and the closely adjacent black portions of the bar fronts which are still visible at each side of the rods. When viewed in any direction oblique to the medial plane of a grille bar, as for example along the line V of Fig. 7, each rod also will contrast sharply with the visible side face of the next dark-coated bar, the contrast being much greater than with single piece and completely plated bars as heretofore proposed.

Consequently, by only plating the forward part of my two-part louvers, namely the part which has by far the smaller surface area and hence requires a comparatively small amount of the plating metal, I can produce a decidedly effective ornamentation. This ornamental effect can be further enhanced by the use of the heretofore described rod-clamping arches or clips, and by varying the locations of such auxiliary rod-clamping means on the several bars of the grille, I can easily and cheaply vary the resulting appearance, as shown for example by the staggered arrangement of rod clips in Fig. 21.

Moreover, since the rods and the recurving of the front edge of each U-sectioned bar both serve to stiffen such a bar, I can form these bars of a much lighter grade of steel than has been found adequate for louver bars of a simple U-shaped section, thereby reducing the cost of the main bar parts in addition to greatly lowering the cost of the needed plating.

Moreover, my invention readily lends itself to a great many changes and modifications, including changes in both the longitudinal and transverse sections of the two parts of my grille or louver bars, in the arrangements for securing these bars to each other, and in the means for supporting such two-part louvers. Hence I do not wish to be limited as to what I am here disclosing, since many variations might be made without departing from the spirit of my invention or from the appended claims.

For example, Figs. 2, 5 and 17 each show a rod as having its end portions offset from the main intermediate rod portion, which is desirable in an automobile radiator grille so that the end portions can be concealed behind the front of the radiator shell while the main rod portions project forwardly. Instead of this, the rods may all be straight as shown in Figs. 12 to 14, which fiures also show bar end formations particularly suitable in connection with V-front radiator grilles.

In embodiments like those of Figs. 1 and 12, it will readily be understood (without corresponding additional illustrations) that the lower ends of the bars and rods of the louver members would be substantial counterparts of the upper ends, and that corresponding lower frame members would be provided for clamping the lower end of each rod to the adjacent bar. Also, that it is immaterial whether my two-part louvers extend horizontally or vertically.

In these figures, the bar portion of each louver member has the end portion of its forward wall flattened to present a flat forward end wall 20 adapted to bear flatwise against the frame member to which it is welded, and this bar end portion is also widened (in proportion to the width of the major part of the bar) as shown in Figs. 14 and 16 so as to widen this bearing face. Then, if the medial planes P of the main portions of the bars are to be oblique to the general plane of the frame to which they are fastened, as in Fig. 14, these forward end walls are correspondingly skewed. With thus constructed bars, the rods 8 may be entirely straight and can be slid endwise through integral arch formations 14 or the bars to positions in which each rod end bears against the adjacent flat end portion 20, and each bar end may still have rearwardly projecting side webs 21 to stiffen it.

In Figs. 12 and 15, the forward frame 3 is welded to a supporting lug 10 fastened by a bolt 11 to a bracket 12 welded to the front of the radiator shell, these supporting parts together with the frame members 3 and 4 and the deformed bar ends being all concealed by the radiator shell.

However, my invention can also be employed without having the louver members fastened first to frame members to form a grille or louver assembly which can be detached as a unit from a radiator shell or other support. For example, Figs. 11 and 11A show the forwardly grooved bars as formed integral with the radiator shell 2 and show the frontal and grooved wall 27 of these bars as curved rearwardly to merge into the upper portion of the front of the radiator shell. In this embodiment, each rod 28 has its end portion extending through alined perforations in the radiator shell front and in a stiffening bar 29 behind that front, against which bar a part of the side walls 26 of the grille bar may also bear, the extreme end of the rod 28 being enlarged to form a head 28A which clamps the bar and rod assembly to the radiator shell.

Fig. 6 shows the flattened bar end 9 as having a grooved portion for receiving the entire thickness of a rod extending into it, so that this rod end will be behind the frame member 3 to which the said bar end is welded.

Figs. 23, 24 and 25 show the use of split ornamenting tubes in place of the solid rods 8 and 28 of the heretofore described figures. Such a split tube 30 can be attached (by a longitudinal sliding movement) either over a widened forward channel wall portion 31 as in Fig. 23; or over the outwardly flaring forward edge portions 32A of a channel-sectioned bar which has its channel opening forwardly directed, as in Fig. 24. Or, the main bar part of my louver may be a solid bar 33 rolled so as to present oppositely facing longitudinal grooves into which the free edge portions of a longitudinally slit ornamenting tube are slid.

With the constructions of Figs. 23, 24 and 25, the ornamenting tube may be considerably larger in diameter than the maximum over-all thickness of the main or bar portions of the louver members, thereby making the ornamental parts of the louver members all the more conspicuous; and Fig. 26 shows that this could likewise be done with channel-sectioned bars of the general type of Fig. 4, as the groove in the forward wall of the bar part of such a two-part louver member need not be deep to prevent sidewise movement of the corresponding rod part. In practice, the ornamenting rods may differ somewhat in their exact diameters, both because of the gradually wearing of the tools used in drawing the rods and also because of variations in the thickness of the plating. To allow for such variations and also for manufacturing variations in the grooved portions of the louver bars, I preferably form the groove sections approximately of the shape of a U with diverging shanks, as in Figs. 26 and 30, so that each rod contacts firmly with the adjacent groove along two spaced lines to avoid rattling.

With the two-piece grille-bar construction of Fig. 24, the resiliency of the main bar portion 32 will aid in holding the slit ornamenting tube 30 attached to it, and the closed rear end of the main bar portion will prevent whistling. However, I am not here presenting claims on distinctive features of this particular type, such claims being reserved for a separate application.

Instead of clamping each end of one of my louver bars conjointly with the adjacent end of the corresponding ornamenting rod between two frame members, after the manner of Figs. 7 and 13, a single frame member or other connecting member may be used to lighten and cheapen the assembly. For example, Figs. 27, 28 and 29 show the conjoint fastening of a louver bar end 33 and a desirably flattened rod end 34 to a frame bar 35 by a rivet 36 extending through all three of these parts. These figures also show the rod end 34 as having its extreme end portion 34A bent over the end of the louver bar and over the upper edge of the frame bar to facilitate the assembling.

Moreover, while I have illustrated and described my invention with particular reference to its employment in connection with grilles or guards for use in front of automobile radiators, I do not wish to be limited in this respect, since my two-part louver assembly (which I am designating in the appended claims as conjointly forming a 'louver member") may be used also for louvers or guards in connection with windows or for other purposes.

I claim as my invention:

1. A louver member for a grille or the like, comprising a bar having its forward edge provided with a single, continuous and forwardly open longitudinal groove, and an ornamenting rod fast with respect to the said member and having the rear portion of the major length of the said rod extending within the said groove, the said rod having its axis extending parallel to the axis of the said groove for substantially the entire length of the rod.

2. A louver member as per claim 1, including plural means spaced longitudinally of the bar from the middle of the bar for clamping the rod to the bar, the rod being resilient and initially formed so that its resiliency will tend to spring the ends of the rod away from the said bar when the middle of the rod is seated in the said groove, whereby the resiliency of the rod cooperates with the said means for holding the said medial portion of the rod firmly against the bottom of the said groove.

3. A louver-type grille, comprising a bar having its forward edge provided with a forwardly open longitudinal groove, an ornamenting rod having its longitudinally medial portion seated in the said groove; and two means respectively fastening the two end portions of the rod to the said bar, the said means cooperating with the groove to prevent a relative movement of the rod with respect to the bar in all directions.

4. A louver member for a grille or the like, comprising a bar having its forward edge provided with a longitudinal groove, a rod having its rear portion seated in the said groove, and plural means spaced longitudinally of the rod for clamping the latter against the grooved edge of the bar.

5. A louver member as per claim 1, in which the rod engages the groove bottom only along two lines longitudinal of the groove and spaced transversely of the groove.

6. A louver-type grille comprising parallel two-part louver members each consisting of a louver bar and an ornamenting rod extending longitudinally of the bar along the forward edge of the bar; spaced cross-connecting members extending transversely of the louver member, and means conjointly securing the two parts of each louver member to each cross-connecting member so as to hold the louver members rigidly spaced and also to hold each rod against the corresponding louver bar.

7. A louver-type grille comprising parallel two-part louver members each consisting of a louver bar and an ornamenting rod extending longitudinally of the bar along the forward edge of the bar; spaced cross-connecting members extending transversely of the louver members respectively adjacent to the two ends of the louver members, and means conjointly securing each cross-connecting member to the adjacent end portions of the bar and rod part of each louver member.

8. In a grille or the like, a plurality of two-part louver members, each comprising an upright bar presenting a forward edge provided with a longitudinal groove, and an upright rod having its rear portion seated in the said groove and its forward portion projecting beyond the said forward edge; and two clamping means respectively clamping the upper end portions of the rods to the upper end portions of the bars.

9. A grille or the like as per claim 8, in which the upper ends of the bars are permanently fastened to one of the clamping members.

10. A grille or the like as per claim 8, in which one of the clamping members has spaced upright grooves in which upper end portions of the several rods are respectively seated.

11. A louver member for a grille or the like, comprising a bar having its forward edge provided with a longitudinal groove, a rod having its rear portion seated in the said groove, two means respectively clamping each end portion of the rod to the corresponding end portion of the bar, and auxiliary means spaced from both of the aforesaid means for clamping an intermediate portion of the rod to the bar.

12. A louver member for a grille or the like, comprising a bar having its major portion of rearwardly open U-shaped section and having its end portions flattened in a plane transverse of the shanks of the U-formation, the bar having an exterior longitudinal groove extending along its forwardly facing U-back portion; a rod having its rear portion extending into the said groove; and two means respectively fastening the two rod ends to the said flat end portions of the bar to retain the rod in its said disposition with respect to the groove.

13. A louver member for a grille or the like, comprising a bar of greater width than thickness, an ornamenting rod extending contiguous and parallel to the bar along a narrow edge of the bar for substantially the entire length of the bar, and a separately formed clip secured to the bar and embracing a portion of the rod intermediate the ends of the rod to hold the rod against the bar.

14. A louver member for a grille or the like, comprising a U-sectioned bar having its U-back provided with spaced perforations, a rod extending along the said U-back, and a plurality of clips interlocked with the bar and respectively embracing longitudinally spaced portions of the rod, each clip extending through one of the said perforations.

15. A grille or louver including parallel louver members each comprising a louver bar and a rod bearing rearwardly against the forward edge of one of the said bars; and two means respectively clamping the opposite end portions of all the said rods against the said bars; the forward edge of each bar having its end portions offset rearwardly from its intervening portion so as to permit the said intervening bar portion to project through an opening in a member which conceals the said clamping means.

16. The combination with a louver bar having substantially parallel sides of greater width than the forward edge of the bar, of an ornamenting rod extending longitudinally of the bar and held against the said forward bar edge, the said rod being of an appearance contrasting with that of the said sides and edge of the bar.

17. A constituent for a louver-type grille or the like, comprising a louver member of a channel-sectioned formation throughout its length, each end portion of the said member being widened so as to have the webs of its channel formation spread farther apart than in the part of the said member between these end portions; the channel back of each widened end portion of its channel formation presenting a flat outward face and affording a wide bearing against an element to which this end portion is to be secured, and the greater spread of the channel webs in each end portion affording ready access for the welding of the channel back of that end portion to such an element.

18. A grille for guarding an opening in an upright frontal member, comprising two cross-bars extending behind the parts of the frontal member respectively above and below the said opening, and spaced louver blades spanning the two bars, each blade having its end portions disposed respectively behind the two cross-bars; each louver blade being continuously of a rearwardly open channel-sectioned formation and being so formed that the webs of its channel formation in the part of the blade extending across the said opening extend substantially parallel to each other and at right angles to the general plane of the said opening; each end portion of the louver blade having the webs of its channel formation spread farther apart than these webs are in the aforesaid part of the blade and having the outward face of its channel back in flatwise engagement with the cross-bar adjacent to it, affording ready access for the fastening of the louver blade to the cross bars.

LEE B. GREEN.